(12) United States Patent
Nguyen et al.

(10) Patent No.: US 12,045,021 B2
(45) Date of Patent: Jul. 23, 2024

(54) SYSTEM AND METHOD FOR MANAGING WELLSITE EVENT DETECTION

(71) Applicant: Schlumberger Technology Corporation, Sugar Land, TX (US)

(72) Inventors: Nam Nguyen, Houston, TX (US); Jonathan Wun Shiung Chong, Kuala Lumpur (MY); Carlos Penedo Rocha, Clamart (FR); Pengyu Yuan, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 325 days.

(21) Appl. No.: 17/595,175

(22) PCT Filed: May 17, 2019

(86) PCT No.: PCT/US2019/032771
§ 371 (c)(1),
(2) Date: Nov. 10, 2021

(87) PCT Pub. No.: WO2020/236131
PCT Pub. Date: Nov. 26, 2020

(65) Prior Publication Data
US 2022/0221826 A1 Jul. 14, 2022

(51) Int. Cl.
*G05B 13/02* (2006.01)
*E21B 43/12* (2006.01)
(Continued)

(52) U.S. Cl.
CPC ........ *G05B 13/0265* (2013.01); *E21B 43/128* (2013.01); *G05B 23/0262* (2013.01);
(Continued)

(58) Field of Classification Search
None
See application file for complete search history.

(56) References Cited

U.S. PATENT DOCUMENTS

| 6,789,620 B2 | 9/2004 | Schultz et al. |
| 10,048,702 B1 | 8/2018 | Florence et al. |
| (Continued) | | |

FOREIGN PATENT DOCUMENTS

| CN | 115631143 A * | 1/2023 |
| WO | 2019/125359 A1 | 6/2019 |

OTHER PUBLICATIONS

International Search Report and Written Opinion for PCT/US2019/032771 dated Aug. 15, 2019 (13 Pages).

*Primary Examiner* — Hien D Khuu
(74) *Attorney, Agent, or Firm* — Jeffrey D. Frantz (57) ABSTRACT

A method for detecting events includes receiving measurements from a plurality of sensors, and executing a machine learning model trained to identify events based on the measurements. The machine learning model identifies the events based on the measurements. The method also includes determining based on the measurements and the identified events that training applied to the machine learning model is to be modified. A modified training data set is generated based on the measurements and an initial training data set used to train the machine learning model to identify the events. The modified training data set is applied to retrain the machine learning model.

15 Claims, 8 Drawing Sheets

(51) Int. Cl.
*G05B 23/02* (2006.01)
*G05D 7/06* (2006.01)

(52) U.S. Cl.
CPC ........ *G05D 7/0676* (2013.01); *E21B 2200/20* (2020.05); *G05B 2223/02* (2018.08)

(56) References Cited

U.S. PATENT DOCUMENTS

| | | |
|---|---|---|
| 2005/0043921 A1 | 2/2005 | Zhu et al. |
| 2007/0088534 A1* | 4/2007 | MacArthur ........ G05B 13/0295 703/17 |
| 2008/0010020 A1* | 1/2008 | Ellender .................. G01V 1/40 702/6 |
| 2009/0114445 A1 | 5/2009 | Dashevskiy |
| 2012/0191633 A1* | 7/2012 | Liu ...................... E21B 47/008 706/12 |
| 2013/0304679 A1 | 11/2013 | Fleming et al. |
| 2015/0148919 A1* | 5/2015 | Watson .................. G06N 5/043 700/31 |
| 2017/0363088 A1* | 12/2017 | Nguyen .................. F04D 13/10 |
| 2019/0102676 A1* | 4/2019 | Nazari ...................... G06N 3/08 |
| 2019/0287005 A1* | 9/2019 | Subramaniyan ......... G06N 5/04 |
| 2019/0354071 A1* | 11/2019 | Turney .................... G06F 30/20 |
| 2019/0384982 A1* | 12/2019 | Huang ................ G06F 18/2413 |
| 2020/0210894 A1* | 7/2020 | Mimura .................... G06N 5/02 |
| 2021/0082098 A1* | 3/2021 | Kumbhare ............. G06T 7/0004 |
| 2021/0123431 A1* | 4/2021 | Jaaskelainen ........ G01V 99/005 |
| 2021/0181374 A1* | 6/2021 | Sandnes .................. E21B 43/00 |
| 2022/0146993 A1* | 5/2022 | Inagaki .................... G06N 3/04 |
| 2023/0085072 A1* | 3/2023 | Turney .................... F24F 11/63 700/276 |

* cited by examiner

SYSTEM AND METHOD FOR MANAGING WELLSITE EVENT DETECTION

CROSS-REFERENCE TO RELATED APPLICATIONS

This application is a National Stage Entry of PCT Application No. PCT/US2019/032771, filed on May 17, 2019.

BACKGROUND

A wide variety of systems are deployed to develop and produce from a well. For example, a drilling rig is deployed at a wellsite to drill the well. The drilling rig includes a variety of systems, such as a top drive, mud pumps, etc. that facilitate drilling of a borehole at the website. After the well has been drilled, production equipment is deployed at the wellsite to extract fluids from the well. The production equipment may include an electrical submersible pump (ESP) to artificially lift fluids that do not flow from subsurface formations to the surface responsive to natural forces.

If wellsite equipment fails during operation, the equipment must be repaired or replaced, which can be costly and result in delays or lost production. Wellsite systems include sensors that monitor the operation of the equipment. Measurements captured by the sensors may be used to identify events that are indicative of the operating condition of the equipment. Surveillance engineers may interpret the measurements to determine the operational condition of the equipment.

SUMMARY

In one example, an electrical submersible pump system includes an electrical submersible pump (ESP), a plurality of sensors, an event detection system, and a monitoring system. The sensors are coupled to the ESP, and configured to measure parameters of operation of the ESP. The event detection system is coupled to the sensors, and includes a processor configured to execute a machine learning model trained to identify events related to the ESP based on measurements received from the sensors. The monitoring system is communicatively coupled to the event detection system. The monitoring system is configured to receive the measurements from the event detection system, and to receive the events identified by the event detection system based on the measurements. The monitoring system is also configured to determine, based on the received measurements and events, that the training applied to the machine learning model is to be modified. The monitoring system is further configured to generate a modified training data set based on an initial training data set used to train the machine learning model to identify the events and the received measurements, and to apply the modified training data set to retrain the machine learning model.

In another example, an event detection system includes an event detection system and a monitoring system. The event detection system includes a plurality of sensors and a processor coupled to the sensors. The processor is configured to execute a machine learning model trained to identify events based on measurements received from the sensors. The monitoring system is coupled to the event detection system. The monitoring system is configured to receive the measurements from the event detection system, and receive the events identified by the event detection system based on the measurements. The monitoring system is also configured to determine, based on the received measurements and events, that the training applied to the machine learning model is to be modified. The monitoring system is further configured to generate a modified training data set based on the received measurements and an initial training data set used to train the machine learning model to identify the events, and to apply the modified training data set to retrain the machine learning model.

In a further example, a method for detecting events includes receiving measurements from a plurality of sensors, and executing a machine learning model trained to identify events based on the measurements. The machine learning model identifies the events based on the measurements. The method also includes determining based on the measurements and the identified events that training applied to the machine learning model is to be modified. A modified training data set is generated based on the measurements and an initial training data set used to train the machine learning model to identify the events. The modified training data set is applied to retrain the machine learning model.

In a yet further example, a method for monitoring an event detection system includes receiving, from the event detection system: sensor measurements analyzed by a machine learning model of the event detection system to detect events, and events identified by the event detection system based on the sensor measurements. Based on the measurements and the identified events, the method determines that training applied to the machine learning model is to be modified. A modified training data set is generated based on the measurements and an initial training data set used to train the machine learning model to identify the events. Weight values derived from the modified training data set are transferred to the event detection system for use in the machine learning model.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Because of the cost associated with equipment failure or equipment performance degradation, the operation of wellsite equipment is continuously monitored. The cost of such monitoring is reduced, and the efficiency increased, by deploying automated event detection systems to analyze equipment operation and detect various events related to the operation of the equipment. For example, an event detection system may identify events indicating that the equipment is operating, events indicative of a change in the equipment's operational environment, events indicating that the operational state of the equipment is declining, etc.

The event detection systems analyze measurements received from sensors disposed on the equipment and/or in the operating environment of the equipment to identify events relevant to the equipment. In a specific example, an event detection system coupled to an electrical submersible pump (ESP) analyzes motor voltage, motor current, motor temperature, pump intake pressure, pump discharge pressure, and other parameters to identify events indicative of the state of the ESP. In some event detection systems, the analysis is performed by a machine learning model trained to identify various events related to the operation of the equipment. The machine learning model receives the measurements generated by the sensors associated with the equipment being monitored, and, based on the training provided to the machine learning model, identifies patterns in the measurements that indicate the occurrence of a particular event (i.e., the probability that a particular event has occurred or is occurring).

The effectiveness of the machine learning model at identifying events is a function of the training provided. A training data set used to train a machine learning model to identify events relevant to a given piece of equipment may be derived from the measurements previously generated by the sensors coupled to any number of instances of the given piece of equipment. For example, an event detection system deployed to monitor operation of an ESP in a first well may be trained using data previously generated by the sensors monitoring operation of the ESPs on any number (e.g., a large number) of other wells.

Because each well is different, and can change over time, a training data set applied to train a machine learning model to identify events related to particular piece of equipment may provide sub-optimal detection of events in a particular well, and/or as conditions in the well change over time. The event detection systems disclosed herein improve event detection accuracy by monitoring the performance of a machine learning model deployed to identify events associated with a given piece of equipment. Measurements generated by sensors associated with the equipment, and events identified by the machine learning model based on the measurements, are transmitted to a monitoring system and analyzed to quantify event identification errors in the machine learning model. Event identification errors include events that the machine learning model failed to identify and false events (events identified when no event was actually present) identified by the machine learning model.

If the rate of event identification errors in a deployed machine learning model exceed a threshold, then the monitoring system may generate a modified training data set to apply to the deployed machine learning model. The modified training data set may be derived from a combination of the initial training data set applied to train the machine learning model, and the sensor measurements (i.e., local data) analyzed by the machine learning model, transmitted to the monitoring system, and analyzed to measure event detection performance. The monitoring system determines how much of the local data is to be added to the initial training data set to produce the modified training data set, and generates the modified training data set accordingly. The monitoring system applies the modified training data set to train an offline machine learning model (not the deployed machine learning model). When training of the offline machine learning model is complete, the monitoring system transmits the weight values generated in the offline machine learning model by application of the modified training data set to the deployed event detection system, where the weights are transferred to the deployed machine learning model and applied to identify events. Retraining of the deployed machine learning model is accomplished by replacement of the weight values, and the deployed machine learning model is not removed from service for retraining. Thus, the event detection system of the present disclosure provides for improvement in event detection performance in a particular environment by retraining a deployed machine learning model based on the sensor measurements produced in the particular environment and analyzed by the deployed machine learning model. The deployed machine learning model is retrained to improve performance while providing continuous identification of events.

Figure 1:
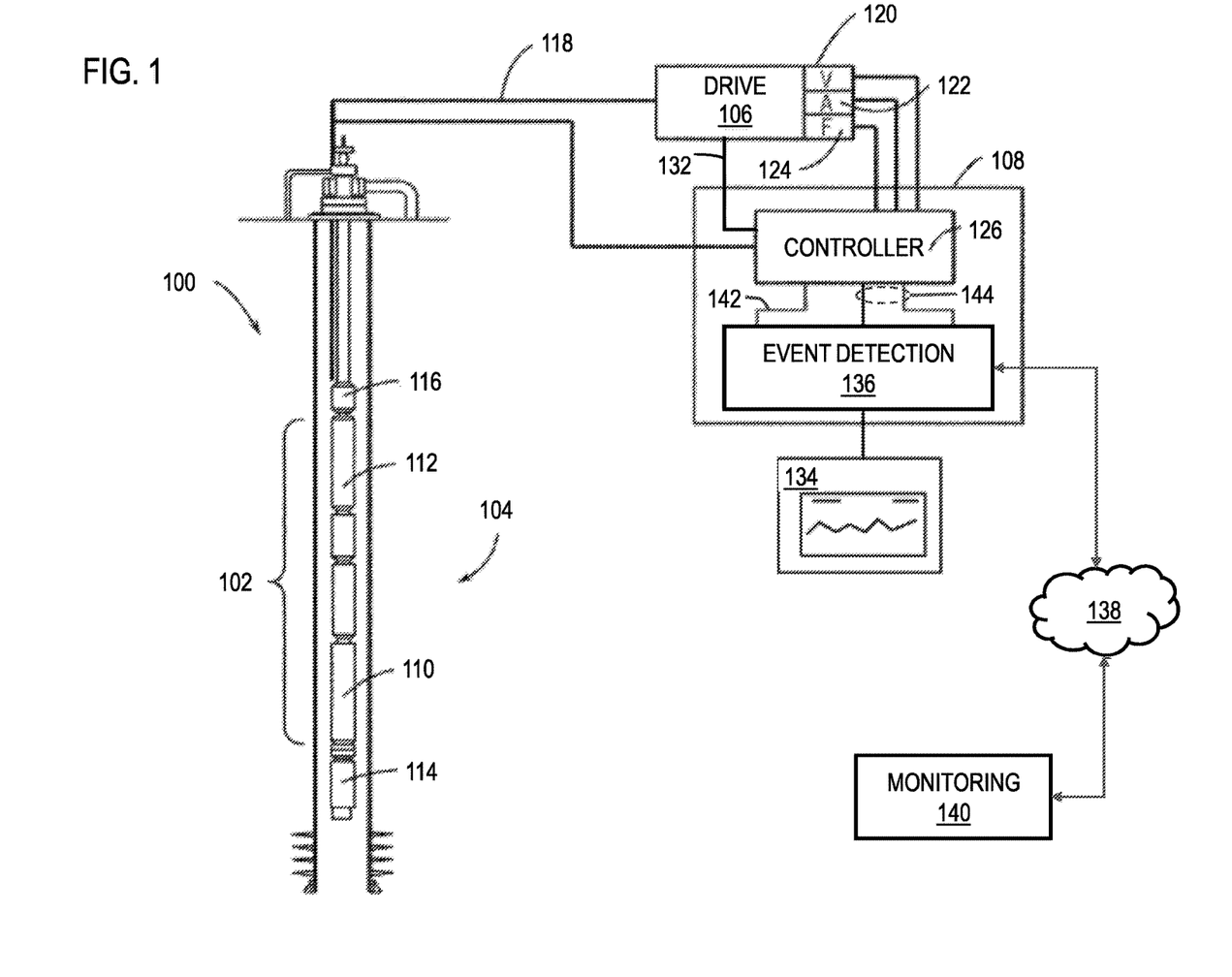
FIG. 1 shows a schematic level diagram for an example electrical submersible pump system that includes event detection in accordance with the present disclosure.

FIG. 1 shows a schematic level diagram for an example ESP system 100 that includes event detection in accordance with the present disclosure. The ESP system 100 includes an ESP 102 disposed in a wellbore 104, and drive circuitry 106 and processing circuitry 108 disposed at the surface. Implementations of the ESP system 100 may include various other downhole tools such as packers, by-pass tubing, ESP encapsulation, and/or other tools. The well associated with the ESP system 100 may produce any of a variety of fluids, such as liquid hydrocarbons or water. In the case of an oil well, the ESP 102 may be deployed to improve production of hydrocarbons.

The ESP 102 includes a motor 110 and a pump 112. The motor 110 operates to drive the pump 112 in order to increase movement of fluid to the surface. The ESP 102 further includes an intake pressure sensor 114, this may be an integral part of the ESP 102 or be a separate device. The intake pressure sensor 114 may be a part of a multisensory unit that includes a variety of sensors. The intake pressure sensor 114 measures the pressure upstream of the ESP 102. The ESP 102 further includes a discharge pressure sensor 116, which may be an integral part of the ESP 102, or may be a separate device. The discharge pressure sensor 116 measures the pressure downstream of the ESP 102. In some implementations of the ESP system 100, temperature sensors (not shown) are included in the ESP 102 or as part of a multisensory unit. The temperature sensors may measure the temperature of the fluid at an intake of the ESP and/or measure the temperature of the motor 110.

The motor 110 of the ESP 102 receives electrical drive signals from the drive circuitry 106, which is typically located at the surface. The drive circuitry 106 controls the power to the motor 110, which is provided by a generator or utility connection (not shown). In the implementation of the ESP system 100 shown in FIG. 1, the drive circuitry 106 is a variable speed driver. The drive circuitry 106 provides drive signals to the ESP 102 through an electrical conductor 118. The drive circuitry 106 is either connected to or includes a variety of sensors for monitoring the electrical signals provided to the ESP 102. In some implementations, the drive circuitry 106 includes a voltage sensor 120, a current sensor 122, and a frequency sensor 124. The voltage sensor 120 acquires samples of the voltage of the drive signals provided via the electrical conductor 118, and digitizes the voltage samples. Similarly, the current sensor 122 acquires samples representative of the current of the drive signals provided via the electrical conductor 118, and digitizes the current samples. The frequency sensor 124 measures the frequency of the drive signals provided to the ESP 102. The sample rate implemented by the voltage sensor 120, the current sensor 122, and/or the frequency sensor 124 may vary based on the frequencies of the signals to be digitized. In some implementations of the ESP system 100, the voltage sensor 120, the current sensor 122, and/or the frequency sensor 124 may be separate from the drive circuitry 106. In some implementations of the ESP system 100, the drive signals provided to the ESP 102 are multi-phase (e.g., three-phase), and the voltage sensor 120 and the current sensor 122 measure the voltage and current of each phase. The drive circuitry 106, or other circuitry associated with the voltage sensor 120 and the current sensor 122 may include sampling circuitry, and one or more analog-to-digital converter with sufficient resolution and digitization speed to capture a highest frequency of interest in the voltage and current signals being digitized.

The drive circuitry 106 provides measurements of voltage, current, and/or frequency of the drive signal to the processing circuitry 108 for further processing. The processing circuitry 108 is also communicatively connected to the intake pressure sensor 114, the discharge pressure sensor 116, temperature sensors, and other sensors coupled to or part of the ESP 102. The processing circuitry 108 receives measurements of intake pressure from the intake pressure sensor 114 and receives measurements of discharge pressure from discharge pressure sensor 116. While in some embodiments, the processing circuitry 108 may receive measurements (intake pressure, discharge pressure, voltage, current, and/or frequency) in real-time or near real-time, in some implementations, the processing circuitry 108 may receive at least some measurements after a time delay.

The processing circuitry 108 includes a controller 126 and an event detection system 136. The controller 126 is communicatively connected to the drive circuitry 106 and the various sensors that are coupled to or a part of the ESP 102. In various implementations of the processing circuitry 108, the controller 126 is located at the well site or a remote location. For example, in some implementations, the controller 126 is not integrated with the processing circuitry 108, but is rather connected locally by a wired or wireless data connection. In such implementations, the controller 126 may be a computer that establishes a data connection with the processing circuitry 108. In an alternative implementation, the processing circuitry 108 transmits the measured values to a remote computer or server through a wired, wireless, or satellite data connection. In these implementations, the controller 126 is located remotely from the processing circuitry 108.

The controller 126 also provides control signals 132 to the drive circuitry 106. The control signals 132 may cause the drive circuitry 106 to change the voltage, current, and/or frequency of the drive signals provided to the ESP 102 by the drive circuitry 106. The controller 126 may generate the control signals 132 based on the measurements received from the voltage sensor 120, the current sensor 122, the frequency sensor 124, the intake pressure sensor 114, the discharge pressure sensor 116, or other sensors coupled to the ESP 102.

The event detection system 136 is coupled to the controller 126. The controller 126 receives measurements 144 generated by the voltage sensor 120, the current sensor 122, the frequency sensor 124, the intake pressure sensor 114, the discharge pressure sensor 116, or other sensors coupled to the ESP 102, and analyzes the measurements to identify events relevant to the operation of the ESP 102. The events identified by the event detection system 136 may be conditions in which the pump 112 is operating under stress, which may happen when the pump 112 is operating at low/no flow condition. Such events are referred to as low flow due to insufficient lift (or "LF-IL") events and low flow due to gas interference (or "LF-GI") events. In the occurrence of an LF-IL event, the pressure the pump 112 generates is not enough to lift fluids to the surface, either due to the pump running below sufficient frequency or due to excessive back pressure. In LF-GI events where excessive gas is present in the system, the pump 112 may struggle to cycle through gas, which can potentially lead to locking the pump 112, which may be a separate event referred to as low flow due to gas locking (or "LF-GL"). Under these conditions, the reduced fluid velocity flowing past the motor 110 may not be sufficient to cool the motor 110 and the pump 112. Additionally, as the flow rate tends toward zero, so too does system efficiency, and thus any energy consumed by the ESP 102 is converted to localized heat. Both phenomena lead to overheating, resulting in failure of the pump 112 unless a timely action is taken.

The event detection system 136 may communicate identified events 142 to the controller 126, and the controller 126 may modify the operation of the ESP 102 responsive to an event. For example, responsive to an event, the controller 126 may cause the drive circuitry 106 to change the speed of (temporarily slow or halt) the motor 110.

The event detection system 136 may be coupled to a display 134. The display 134 may be a visual display device via which the event detection system 136 presents information regarding identified events. For example, the event detection system 136 may provide a graphical display of sensor measurements and events identified based on the measurements via the display 134.

The event detection system 136 is coupled to a monitoring system 140 via the network 138. The network 138 may be any combination of a local area network, a wide area network, the Internet, and/or other data communication network. In one example, the event detection system 136 is located at a wellsite with the ESP 102, and the monitoring system 140 is disposed at a site remote from the wellsite. The event detection system 136 may transmit the measurements 144 received from the various sensors coupled to the ESP 102, and the events 142 identified based on the measurements 144, to the monitoring system 140 for storage and analysis.

Figure 2:
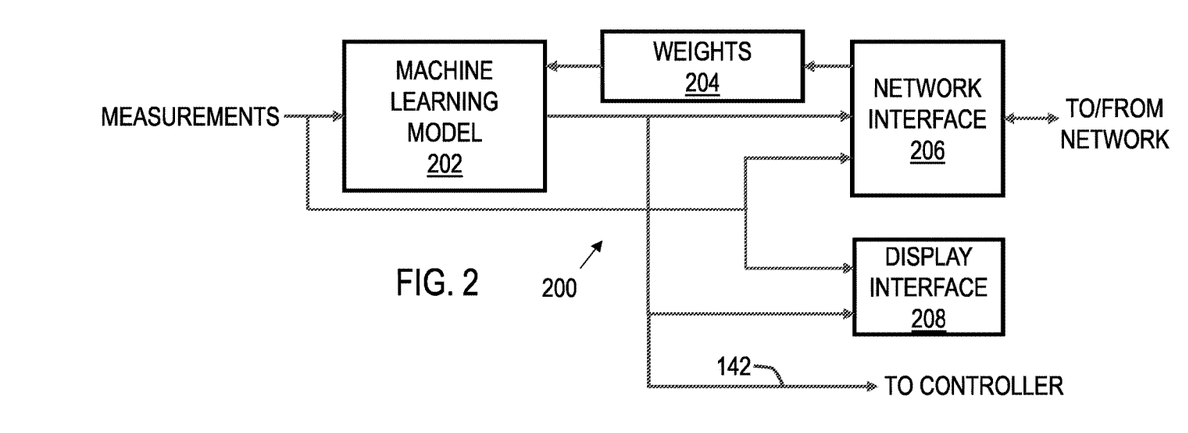
FIG. 2 shows a block diagram for an example event identification system in accordance with the present disclosure.

FIG. 2 shows a block diagram for an example event detection system 200 in accordance with the present disclosure. The event detection system 200 is an implementation of the event detection system 136. The event detection system 200 includes a machine learning model 202, weights 204, a network interface 206, and a display interface 208. The network interface 206 and the display interface 208 include circuits that couple to the event detection system 200 to the network 138 and the display 134 respectively. The event detection system 200 provides the identified events 142 and the measurements 144, from which the identified events 142 are identified, to the display interface 208 for display and to the network interface 206 for transmission to the monitoring system 140 via the network 138. The weights 204 includes storage, such as volatile or non-volatile memory for storing weight values applied by the machine learning model 202.

The machine learning model 202 may be a neural network, such as a convolutional neural network, trained to identify events 142 based on the measurements 144 provided by the sensors coupled to the ESP 102. The weight values stored in weights 204 are produced by training the machine learning model 202 to identify events and are applied in the machine learning model 202 to identify events 142 based on the measurements 144.

Figure 3:
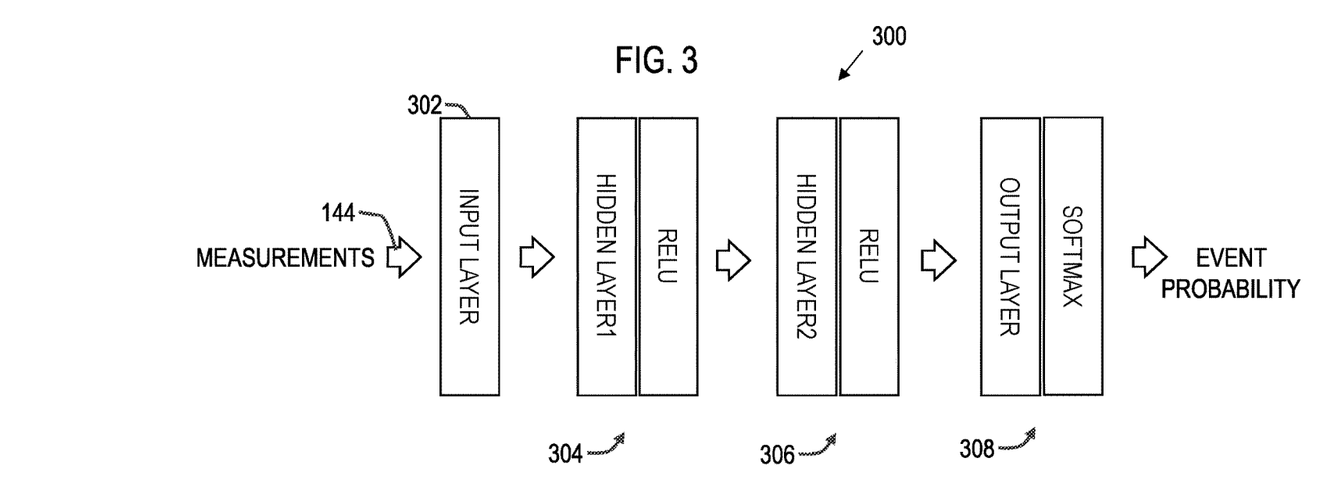
FIG. 3 shows a block diagram for an example machine learning model in accordance with the present disclosure.

FIG. 3 shows a block diagram for an example machine learning model 300 in accordance with the present disclosure. The machine learning model 300 is an implementation of the machine learning model 202. The machine learning model 300 includes a plurality of layers that process the measurements 144 to identify events 142. The example machine learning model 300 shown in FIG. 3 includes four layers, but different implementations of the machine learning model 300 may include more or fewer layers. The machine learning model 300, as shown in FIG. 3, includes an input layer 302, a hidden layer 304, a hidden layer 306, and an output layer 308. Some implementations of the machine learning model 300 include a different number of hidden layers. The input layer 302 includes the variables processed by the machine learning model 300, i.e., the different sensor measurements (e.g., motor current, intake pressure, motor temperature, etc.) and any parameters derived therefrom (e.g., differential pressure) that are processed by the machine learning model 300 to identify events. The hidden layer 304 and the hidden layer 306 include a number of nodes. Each node applies a weight (e.g., a weight value from the weights 204) to each input received from the previous layer, and combines the weighted inputs to produce an output that is provided to the next layer. The output layer 308 includes a number of nodes (e.g., a node for each output). Like the nodes of the hidden layers, each node of the output layer 308 applies a weight (e.g., a weight value from the weights 204) to each input received from the previous layer, and combines the weighted inputs to produce an output. The outputs generated by the output layer 308 may include a probability value corresponding to each event the machine learning model 300 is trained to recognize based on the measurements 144.

Returning now to FIG. 1, the monitoring system 140 receives the measurements 144 and the identified events 142 from the event detection system 136, and analyzes the measurements 144 and the identified events 142 to measure the performance of the event detection system 136. The machine learning model of the event detection system 136 is trained to identify events using a training data set derived from the sensor measurements (and events identified therefrom) produced by multiple (e.g., a large number of) ESPs operating in different wells. Such a training data set may be referred to as a global training data set. Because every well is different the accuracy of the event detection system 136 in identifying events using a machine learning model trained with a global training data set may vary, and may fall below a threshold for desired event identification accuracy. That is, for a particular well, the machine learning model trained with the global training data set may fail to identify too many events and/or may erroneously identify too many events where no event is present. In analyzing the measurements 144 and the events 142 received from the event detection system 136, the monitoring system 140 identifies event identification errors in the event detection system 136. If the number or rate of event identification errors exceeds a threshold (e.g., the ratio of event identification errors to actual events exceeds a threshold), then the monitoring system 140 may retrain the machine learning model of the event detection system 136 to more accurately identify events occurring at the ESP 102.

To retrain the machine learning model of the event detection system 136, the monitoring system 140 generates a modified training data set by combining at least a portion of the global training data set and at least a portion of the measurements 144 (and associated events as identified by the monitoring system 140). For example, the modified training data set may include a portion of the measurements 144 (and associated events) that produced event identification errors in the event detection system 136, and exclude a corresponding portion of the global training data set. The monitoring system 140 applies the modified training data set to train an offline machine learning model. The offline machine learning model may be local to the monitoring system 140, and is a different instance of the machine learning model deployed in the event detection system 136. As the monitoring system 140 is training the offline machine learning model using the modified training data set, the event detection system 136 continues to identify events using the deployed machine learning model which is trained with the global training data set.

Figure 4:
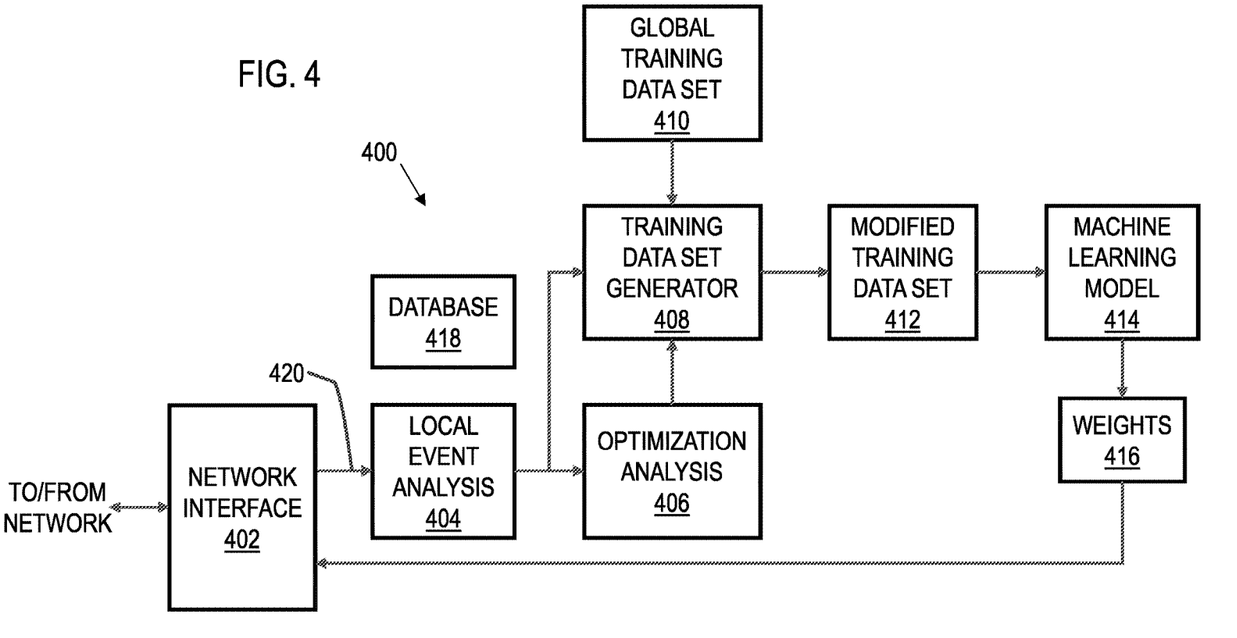
FIG. 4 shows a block diagram for an example monitoring system in accordance with the present disclosure.

When training of the offline machine learning model, with the modified training data set. is complete, the monitoring system 140 extracts the weight values produced by the training from the offline machine learning model with the modified training data set, and transmits the weight values to the event detection system 136 via the network 138. In the event detection system 136, the deployed machine learning model is retrained by applying the received weight values in the various nodes of the deployed machine model. Thus, retraining of the machine learning model in the event detection system 136 is essentially instantaneous, and introduces no lapse in event identification FIG. 4 shows a block diagram for an example monitoring system 400 in accordance with the present disclosure. The monitoring system 400 is an implementation of the monitoring system 140. The monitoring system 400 includes a network interface 402, local event analysis 404, optimization analysis 406, training data set generator 408, and a database 418. The database 418 may store the sensor measurements and events 420 received from the event detection system 136, the global training data set 410, the modified training data set 412, and the weights 416. The network interface 402 couples the monitoring system 400 to the network 138 for receipt of the measurements and events 420 from the event detection system 136 and transmission, to the event detection system 136, of the weights 416 generated by training the offline machine learning model 414 with the modified training data set 412.

The local event analysis 404 analyzes the sensor measurements and events 420 (the sensor measurements and events 420 include the measurements 144 and the identified events 142) received from the event detection system 136 to measure the performance of the event detection system 136 in identifying events in the measurements 144. The local event analysis 404 identifies events in the measurements 144 and determines whether the event detection system 136 correctly identified the events, and determines whether events identified by the event detection system 136 are in fact events based on the measurements 144. Thus, the local event analysis 404 identifies an event identification error rate of the event detection system 136, and identifies the particular measurements 144 for which event identification by the event detection system 136 was in error.

The optimization analysis 406 determines, based on the event identification analysis provided by the local event analysis 404, whether the training of the event detection system 136 should be modified to improve event identification. For example, if the event identification error rate of the event detection system 136 exceeds a threshold, then the optimization analysis 406 may determine whether optimization of the training data based on the measurements 144 and the events identified by the local event analysis 404 based on the measurements 144 will improve event identification in the event detection system 136.

Some implementations of the optimization analysis 406 apply Kullback-Leibler (KL) divergence to determine whether optimization of the training data based on the measurements 144 will improve event identification. In such implementations, the KL divergence between global critical events and local critical events is determined. The greater the difference between the global and local distribution, the more likely optimization of the training data will improve event detection. the KL divergence between local critical events and normal events is determined. The greater the difference between the critical and normal events, the more likely optimization of the training data will improve event detection. KL divergence may be computed using a Box-Cox transform to transform skewed global and local distributions to Gaussian-like distributions, and multivariant KL divergence computed for the Gaussian-like distributions.

If the optimization analysis 406 determines the event identification in the event detection system 136 can be improved by retraining, then the training data set generator 408 generates a modified training data set 412 based on at least a portion of the global training data set 410, and at least a portion of the measurements 144 and the events identified in the measurements 144 by the local event analysis 404. For example, considering the global training data set 410 as the base for the modified training data set 412, a portion of the measurements 144 and events identified in the measurements 144 by the local event analysis 404 may be added to the modified training data set 412, and corresponding portion of the global training data set 410 removed from the modified training data set 412.

The offline machine learning model 414 is trained using the modified training data set 412. The time required to train the offline machine learning model 414 does not affect the operation of the event detection system 136. When training of the offline machine learning model 414 is complete, the modified training data set 412 generated by the training are transmitted to the event detection system 136, and in the event detection system 136, transferred to the deployed machine learning model for use in identifying events in the ESP 102.

The ESP system 100 is one example of use of an event detection system that adaptively retrains a machine learning model to improve event detection in a particular operating environment. Such an event detection system may be suitable for use with various wellsite equipment, such as drilling fluid pumps, top drives, etc. Beyond wellsite equipment, the event detection systems of the present disclosure may be suitable for use in any application that uses a machine learning model to detect events based on sensor measurements, where event detection performance may be improved by retraining the machine learning model based on sensor measurements acquired in the environment in which the sensors operate.

Figure 5:
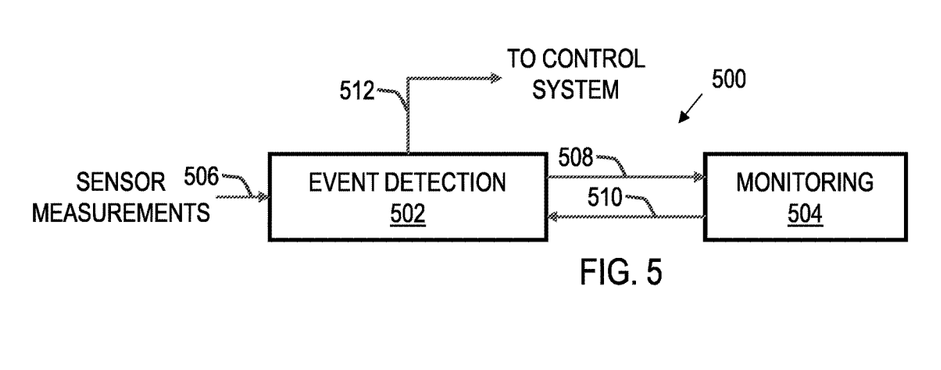
FIG. 5 shows a block diagram for an example event identification system in accordance with the present disclosure.

FIG. 5 shows a block diagram for an example event identification system 500 in accordance with the present disclosure. The event identification system 500 provides adaptive retraining of a machine learning model based on sensor measurements processed by the machine learning model. The event identification system 500 includes an event detection system 502 and a monitoring system 504. The event detection system 502 may be implemented using the event detection system 200 as described herein. The monitoring system 504 may implemented using the monitoring system 400 as described herein.

The event identification system 500 receives sensor measurements 506 and processes the sensor measurements 506 in a machine learning model trained to identify events 512 in the sensor measurements 506. The events 512 identified by the event detection system 502 may be provided to a control system for use in controlling equipment associated with the event identification system 500. For example, in a vehicular application, the event detection system 502 identifies an object in the vehicles environment as an event, and communicates the event to an advanced driver assistance system or autonomous vehicle control system that in turn changes the speed and/or direction of the vehicle to avoid the object.

The event detection system 502 also provides the sensor measurements 506 and the events 512 (measurements and events 508) to the monitoring system 504. The monitoring system 504 analyzes the measurements and events 508 to identify errors in the event identification performed by the event detection system 502. Based on the event identification error rate of the event detection system 502, the monitoring system 504 determines whether to retrain the machine learning model of the event detection system 502 using a modified training data set that includes at least a portion of the sensor measurements 506 and events identified in the sensor measurements 506 by the monitoring system 504. If the event detection system 502 is to be updated, then the monitoring system 504 generates a modified training data set, trains an offline machine learning model using the modified training data set, and transfers weight values generated by training the offline machine learning model to the event detection system 502 for use in event identification.

Figure 6:
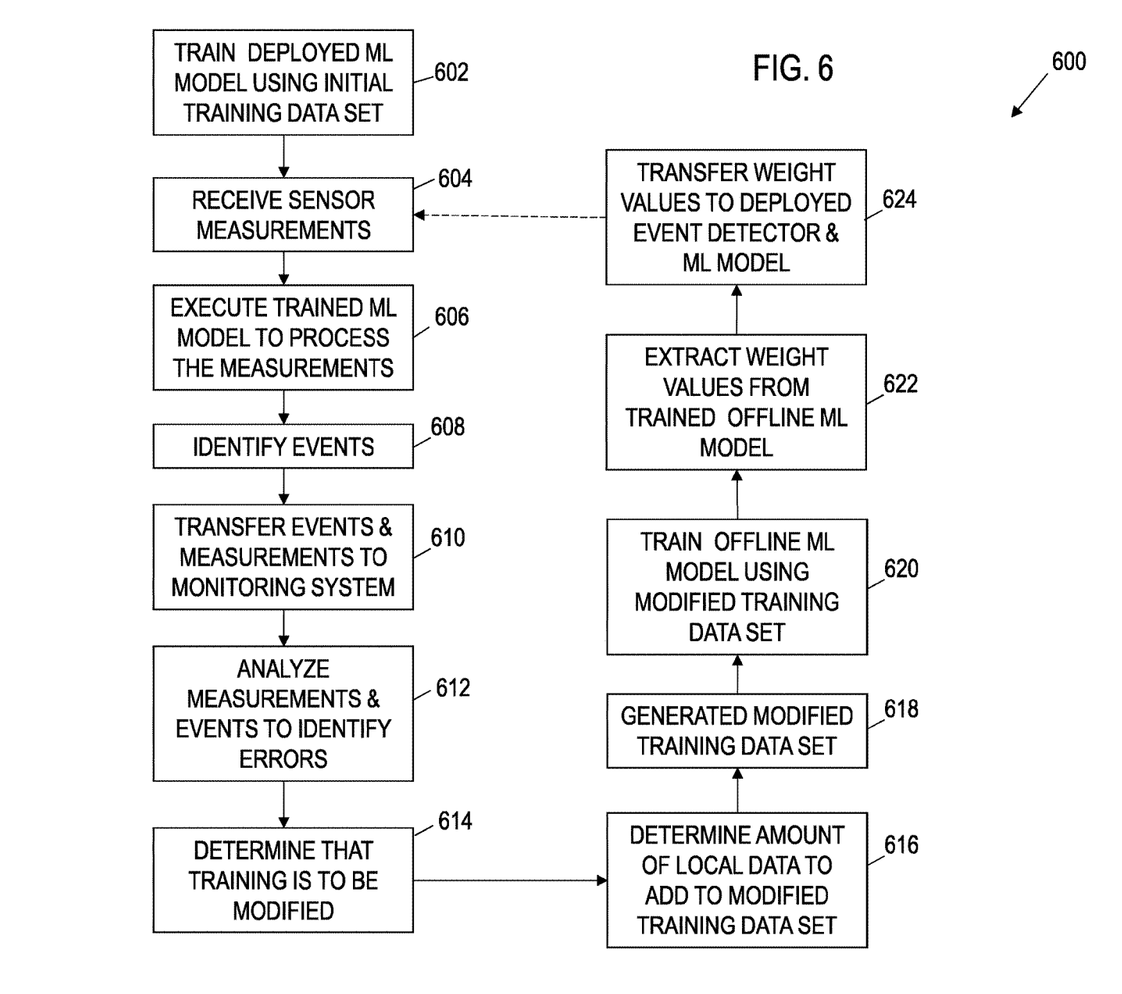
FIG. 6 shows a flow diagram for an example method for detecting events in accordance with the present disclosure.

FIG. 6 shows a flow diagram for an example method 600 for detecting events in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by an instance of a computing system implementing the event detection system 136, the monitoring system 140, the event detection system 200, the monitoring system 400, the event detection system 502, or the monitoring system 504.

In block 602, the machine learning model 202 is trained using an initial training data set. In some embodiments, the initial training data set is based on measurements provided by a plurality of event detection systems other than event detection system 200. The initial training data set may be the global training data set 410 in some implementations. The machine learning model 202 may be deployed as part of the event detection system 200.

In block 604, the event detection system 200 is operating and receiving measurements from sensors for use in event detection.

In block 606, the machine learning model 202 is executed to process the measurements. The machine learning model 202 may be executed by an instance of a computing system (such as the computing system 800 described herein).

In block 608, the machine learning model 202 identifies events based on the received measurements.

In block 610, the event detection system 200 transfers the sensor measurements and the events identified by the machine learning model 202 in block 608 to the monitoring system 400. For example, the event detection system 200 may transfer the measurements and events to the monitoring system 400 via a network, such as the network 138.

In block 612, the monitoring system 400 analyzes the measurements and events received from the event detection system 200 to identify errors in event identification by the event detection system 200.

In block 614, the monitoring system 400 determines, based on the errors in event identification by the event detection system 200, that the training of the machine learning model 202 is to be modified. For example, if an event detection error rate of the event detection system 200 exceeds a threshold, then the monitoring system 400 may determine that the machine learning model 202 is to be retrained.

In block 616, the monitoring system 400 determines an amount of local data (measurements received from the event detection system 200 and corresponding events) to be added to a modified training data set. The monitoring system 400 may identify the particular measurements received from the event detection system 200 to be added to the modified training data set. For example, measurements received from the event detection system 200 for which the machine learning model 202 produced an event identification error may be added to the modified training data set.

In block 618, the monitoring system 400 combines at least a portion of the initial training data set used to train the machine learning model 202 in block 602 and at least a portion of the measurements received from the event detection system 200 in block 610 and the corresponding events identified in block 612 to produce the modified training data set 412. The portion of the measurements included in the modified training data set 412 may include measurements for which the event detection system 200 failed to identify an event or identified an event when no event was indicated.

In block 620, the monitoring system 400 applies the modified training data set 412 to train the offline machine learning model 414. While the monitoring system 400 is being trained the event detection system 200 continues to operate and identify events.

In block 622, training of the offline machine learning model 414 using the modified training data set 412 is complete, and the monitoring system 400 extracts the weights values generated by the training from the offline machine learning model 414. The monitoring system 400 may store the weight values extracted from the offline machine learning model 414 in the database 418.

In block 624, the monitoring system 400 transfers (e.g., via the network 138) the weight values generated by training the offline machine learning model 414 to the event detection system 200. In the event detection system 200, the weight values received from the monitoring system 400 are provided to the machine learning model 202 for use in event identification.

Figure 7:
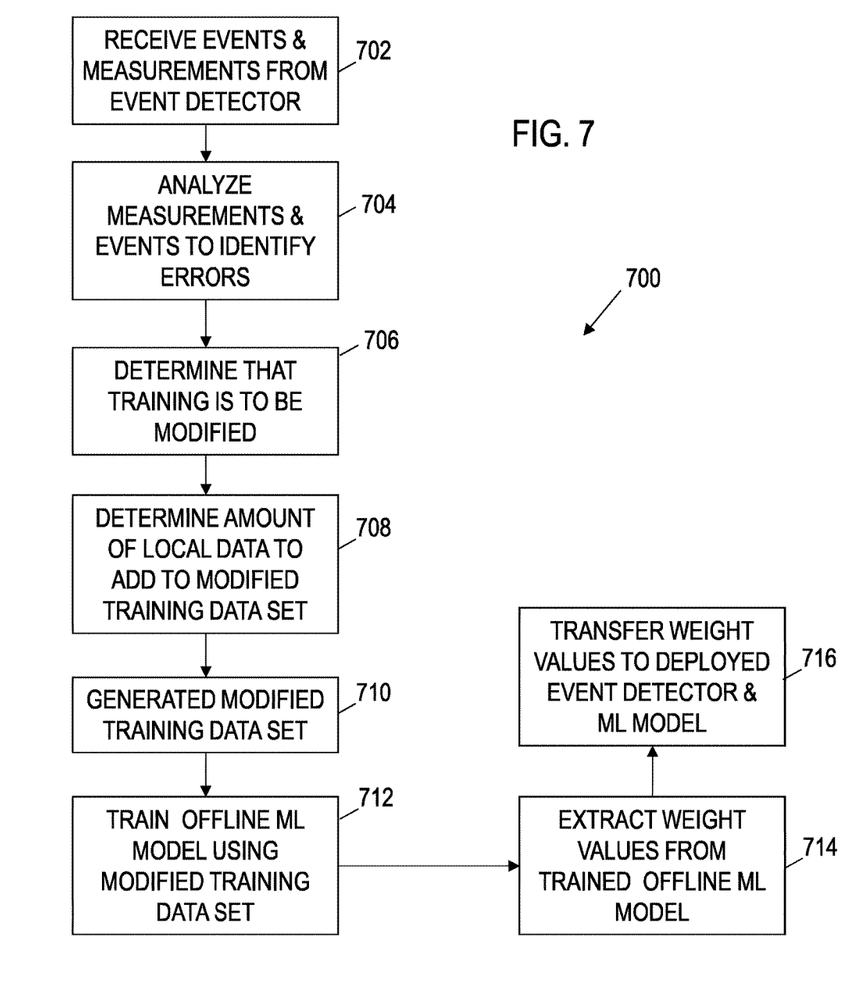
FIG. 7 shows a flow diagram for an example method for monitoring an event detection system in accordance with the present disclosure.

FIG. 7 shows a flow diagram for an example method 700 for monitoring an event detection system in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by an instance of a computing system implementing the monitoring system 140, the monitoring system 400, or the monitoring system 504.

In block 702, the machine learning model 202 has been trained using an initial training data set. The initial training data set may be the global training data set 410. The machine learning model 202 may be deployed as part of the event detection system 200. The event detection system 200 is operating and receiving measurements from sensors for use in event detection. The machine learning model 202 is executed to process the measurements. The machine learning model 202 identifies events based on the received measurements, and the event detection system 200 transmits the sensor measurements and the events identified by the machine learning model 202 based on the sensor measurements to the monitoring system 400. The monitoring system 400 receives the measurements and events transmitted by the event detection system 200.

In block 704, the monitoring system 400 analyzes the measurements and events received from the event detection system 200 to identify errors in event identification by the event detection system 200. For example, the monitoring system 400 analyzes the measurements received from the event detection system 200, identifies events based on the measurements, and compares the events to the events identified by the event detection system 200 based on the measurements. Based on the comparison, the monitoring system 400 identifies errors in event identification by the event detection system 200 (e.g., events that the monitoring system 400 failed to identify or events identified by the event detection system 200 where the event detection system 200 should not have identified an event).

In block 706, the monitoring system 400 determines, based on the errors in event identification by the event detection system 200, that the training of the machine learning model 202 is to be modified. For example, if an event detection error rate of the event detection system 200 exceeds a threshold, then the monitoring system 400 may determine that the machine learning model 202 is to be retrained.

In block 708, the monitoring system 400 determines an amount of local data (measurements received from the event detection system 200 and corresponding events) to be added to a modified training data set. The monitoring system 400 may identify the particular measurements received from the event detection system 200 to be added to the modified training data set. For example, measurements received from the event detection system 200 for which the machine learning model 202 produced an event identification error may be added to the modified training data set.

In block 710, the monitoring system 400 combines at least a portion of the initial training data set used to train the machine learning model 202 in block 602 and at least a portion of the measurements received from the event detection system 200 in block 610 and the corresponding events identified in block 704 to produce the modified training data set 412. The portion of the measurements included in the modified training data set 412 may include measurements for which the event detection system 200 failed to identify an event or identified an event when no event was indicated.

In block 712, the monitoring system 400 applies the modified training data set 412 to train the offline machine learning model 414. While the offline machine learning model 414 is being trained, the event detection system 200 continues to operate and identify events.

In block 714, training of the offline machine learning model 414 using the modified training data set 412 is complete, and the monitoring system 400 extracts the weights values generate by the training from the offline machine learning model 414. The monitoring system 400 may store the weight values extracted from the offline machine learning model 414 in the database 418.

In block 716, the monitoring system 400 transfers (e.g., via the network 138) the weight values generated by training the offline machine learning model 414 to the event detection system 200. In the event detection system 200, the weight values received from the monitoring system 400 are provided to the machine learning model 202 for use in event identification.

Figure 8:
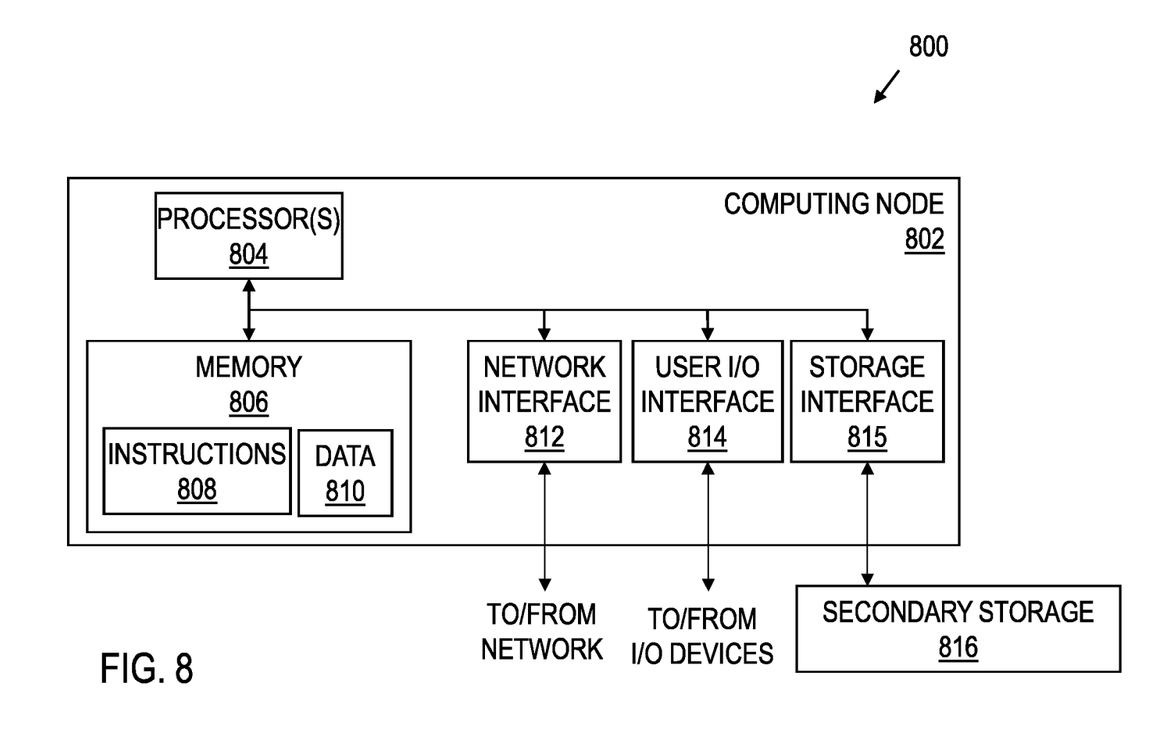
FIG. 8 shows a block diagram for a computing system 800 suitable for use in the systems disclosed herein.

FIG. 8 shows a block diagram for a computing system 800 suitable for use in the systems disclosed herein. Examples of the computing system 800 may be applied to implement the controller 126, the event detection system 136, the monitoring system 140, the event detection system 200, the monitoring system 400, the event detection system 502, and/or the monitoring system 504. The computing system 800 includes one or more computing nodes 802 and secondary storage 816 that are communicatively coupled (e.g., via the storage interface 815). One or more of the computing nodes 802 and associated secondary storage 816 may be applied to provide the functionality of the controller 126, the event detection system 136, the monitoring system 140, the event detection system 200, the monitoring system 400, the event detection system 502, and/or the monitoring system 504 described herein.

Each computing node 802 includes one or more processors 804 coupled to memory 806, a network interface 812, and a user I/O interface 814. In various embodiments, a computing node 802 may be a uniprocessor system including one processor 804, or a multiprocessor system including several processors 804 (e.g., two, four, eight, or another suitable number). Processors 804 may be any suitable processor capable of executing instructions. For example, in various embodiments, processors 804 may be general-purpose or embedded microprocessors, graphics processing units (GPUs), digital signal processors (DSPs) implementing any of a variety of instruction set architectures (ISAs). In multiprocessor systems, each of the processors 804 may commonly, but not necessarily, implement the same ISA.

The memory 806 may include a non-transitory, computer-readable storage medium configured to store program instructions 808 and/or data 810 accessible by processor(s) 804. The memory 806 may be implemented using any suitable memory technology, such as static random-access memory (SRAM), synchronous dynamic RAM (SDRAM), nonvolatile/Flash-type memory, or any other type of memory. Program instructions 808 and data 810 implementing the functionality disclosed herein are stored within memory 806. For example, program instructions 808 may include instructions that when executed by processor(s) 804 implement the controller 126, the event detection system 136, the monitoring system 140, the event detection system 200, the monitoring system 400, the event detection system 502, and/or the monitoring system 504 disclosed herein.

Secondary storage 816 may include volatile or nonvolatile storage and storage devices for storing information such as program instructions and/or data as described herein for implementing the controller 126, the event detection system 136, the monitoring system 140, the event detection system 200, the monitoring system 400, the event detection system 502, and/or the monitoring system 504. The secondary storage 816 may include various types of computer-readable media accessible by the computing node 802 via the storage interface 815. A computer-readable medium may include storage media or memory media such as semiconductor storage, magnetic or optical media, e.g., disk or CD/DVD-ROM, or other storage technologies.

The network interface 812 includes circuitry configured to allow data to be exchanged between computing node 802 and/or other devices coupled to a network (such as the network 138). For example, the network interface 812 may be configured to allow data to be exchanged between a first instance of the computing system 800 configured to operate as the event detection system 136, the event detection system 200, or the event detection system 502 and a second instance of the computing system 800 configured to operate as the monitoring system 140, the monitoring system 400, or the monitoring system 504. The network interface 812 may support communication via wired or wireless data networks.

The user I/O interface 814 allows the computing node 802 to communicate with various input/output devices such as one or more display terminals, keyboards, keypads, touchpads, scanning devices, voice or optical recognition devices, or any other devices suitable for entering or retrieving data by one or more computing nodes 802. Multiple input/output devices may be present in a computing system 800.

Those skilled in the art will appreciate that the computing system 800 is merely illustrative and is not intended to limit the scope of embodiments. In particular, the computing system 800 may include any combination of hardware or software that can perform the functions disclosed herein. Computing node 802 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Figure 9:
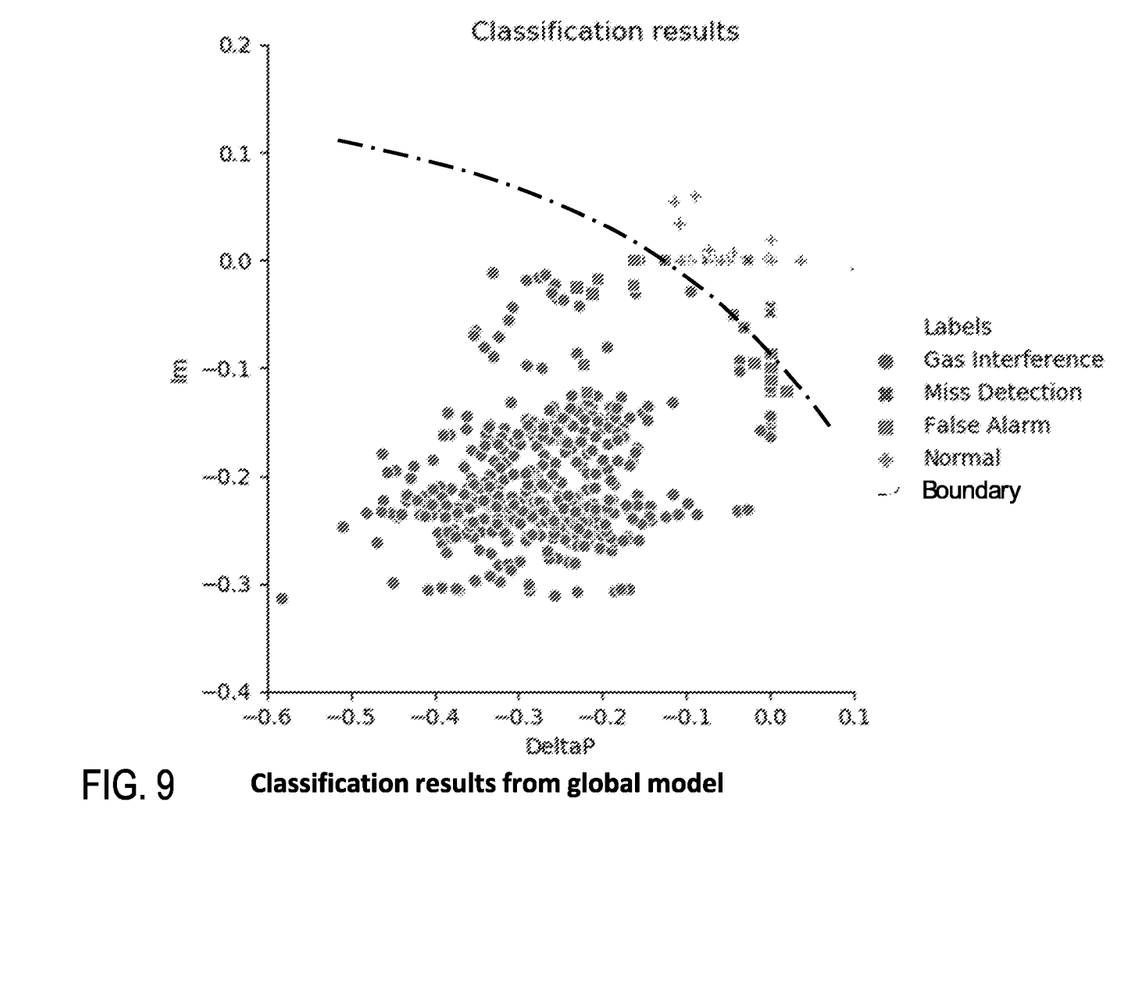
FIG. 9 shows an example of event classification using a machine learning model trained with a global training data set.

FIG. 9 shows an example of event classification using a machine learning model trained with a global training data set. A significant number of events identified by the machine learning model are false alarms.

Figure 10:
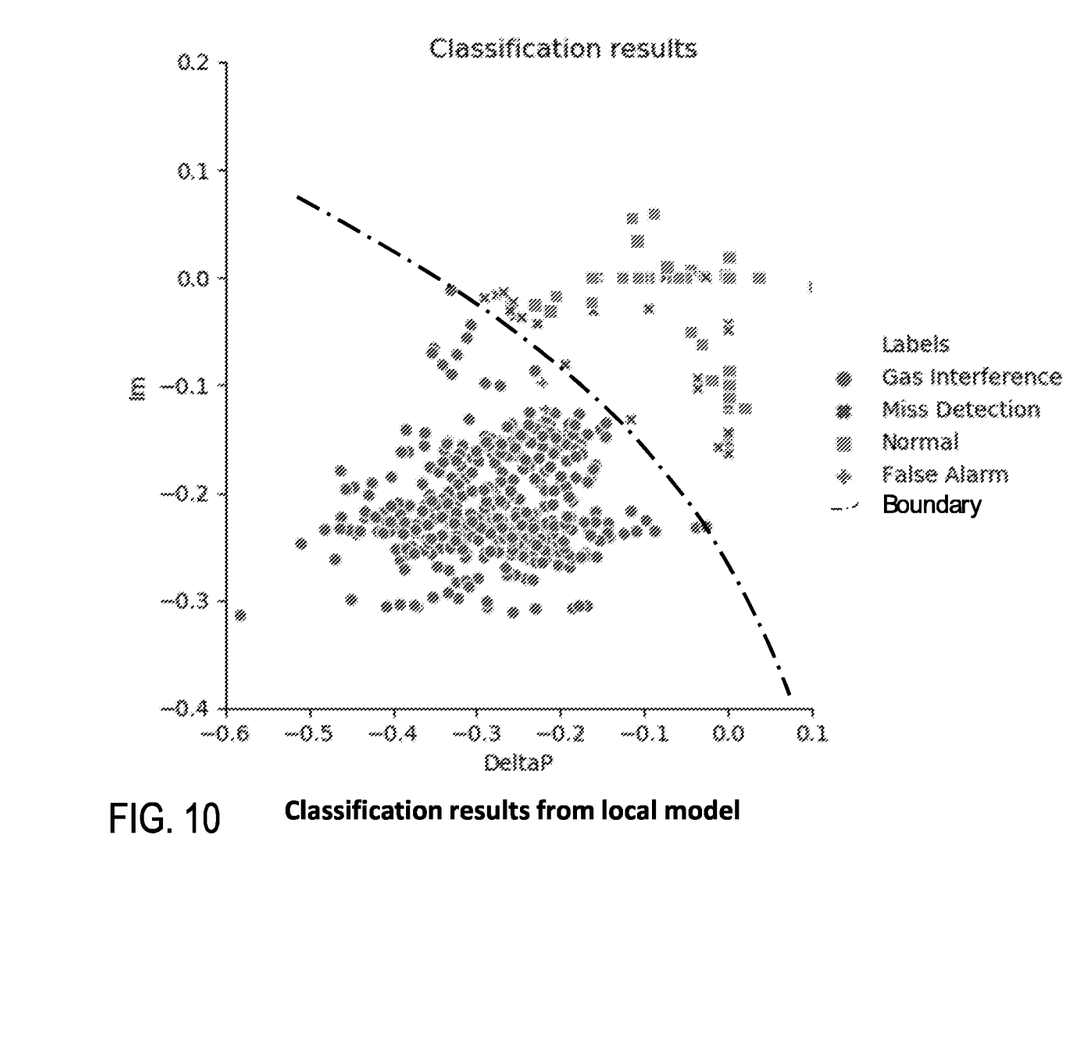
FIG. 10 shows an example of improved event classification using a machine learning model trained with local data added to the global training data set.

FIG. 10 shows an example of improved event classification using a machine learning model trained with local data added to the global training data set. The number of false alarms is substantially reduced, while the number of events identified as normal is greatly increased.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electrical submersible pump system, comprising:
an electrical submersible pump (ESP);
a plurality of sensors coupled to the ESP, and configured to measure parameters of operation of the ESP;
an event detection system coupled to the sensors, and comprising:
processing circuitry configured to execute a machine learning model trained to identify events related to the ESP based on measurements received from the sensors;
a monitoring system communicatively coupled to the event detection system, and configured to:
receive the measurements from the event detection system;
receive the events identified by the event detection system based on the measurements;
determine, based on the received measurements and events, that the training applied to the machine learning model is to be modified based on a cumulative number of event detection errors by the event detection system exceeding a threshold, wherein the cumulative number of event detection errors comprises a number of events identified using the measurements that the event detection system failed to identify, and a number of the events identified by the event detection system being false event detections;
generate a modified training data set based on an initial training data set used to train the machine learning model to identify the events, and the received measurements; and
apply the modified training data set to retrain the machine learning model.

2. The ESP system of claim 1, wherein the monitoring system is configured to:
select measurements received from the event detection system to add to the modified training data set; and
add the measurements selected to a portion of the initial training data set to generate the modified training data set.

3. The ESP system of claim 1, wherein:
the machine learning model is a first machine learning model; and
the monitoring system is configured to apply the modified training data to train a second machine learning model.

4. The ESP system of claim 3, wherein the monitoring system is configured to transfer weight values generated by training the second machine learning model to the event detection system.

5. The ESP system of claim 4, wherein the event detection system is configured to download the weight values into the first machine learning model for use in event detection.

6. The ESP system of claim 1, further comprising ESP control circuitry configured to change a speed of an electric motor of the ESP based on the events identified by the event detection system.

7. An event identification system, comprising:
an event detection system, comprising:
a plurality of sensors;
processing circuitry coupled to the sensors, and configured to execute a machine learning model trained to identify events based on measurements received from the sensors;
a monitoring system coupled to the event detection system, and configured to:
receive the measurements from the event detection system;
receive the events identified by the event detection system based on the measurements;
determine, based on the received measurements and events, that the training applied to the machine learning model is to be modified based on a cumulative number of event detection errors by the event detection system exceeding a threshold, wherein the cumulative number of event detection errors comprises a number of events identified using the measurements that the event detection system failed to identify, and a number of the events identified by the event detection system being false event detections;
generate a modified training data set based on the received measurements and an initial training data set used to train the machine learning model to identify the events; and
apply the modified training data set to retrain the machine learning model.

8. The event identification system of claim 7, wherein the monitoring system is configured to:
select measurements received from the event detection system to add to the modified training data set; and
add the measurements selected to a portion of the initial training data set to generate the modified training data set.

9. The event identification system of claim 7, wherein:
the machine learning model is a first machine learning model; and
the monitoring system is configured to apply the modified training data to train a second machine learning model.

10. The event identification system of claim 9, wherein the monitoring system is configured to transfer weight values generated by training the second machine learning model to the event detection system.

11. The event identification system of claim 10, wherein the event detection system is configured to download the weight values into the first machine learning model for use in event detection.

12. A method for detecting events, comprising:
receiving measurements from a plurality of sensors;
executing a machine learning model trained to identify events based on the measurements;
identifying, by the machine learning model, the events based on the measurements;
determining based on the measurements and the identified events that training applied to the machine learning model is to be modified based on a cumulative number of event detection errors by the machine learning model exceeding a threshold, wherein the cumulative number of event detection errors comprises a number of events identified using the measurements that the machine learning model failed to identify, and a number of the events identified by the machine learning model being false event detections;
generating a modified training data set based on the measurements and an initial training data set used to train the machine learning model to identify the events; and
applying the modified training data set to retrain the machine learning model.

13. The method of claim 12, wherein the machine learning model is a first machine learning model, and the method further comprising generating the initial training data set based on measurements provided by a plurality of machine learning models other than the first machine learning model.

14. The method of claim 12, further comprising:
   selecting one or more of the measurements to add to the modified training data set; and
   adding the one or more of the measurements to a portion of the initial training data set to generate the modified training data set.

15. The method of claim 12, wherein the machine learning model is a first machine learning model; and the method further comprises:
   applying the modified training data to train a second machine learning model; and
   transferring weight values generated by training the second machine learning model to the first machine learning model for use in event detection.

* * * * *